Patented Oct. 12, 1948

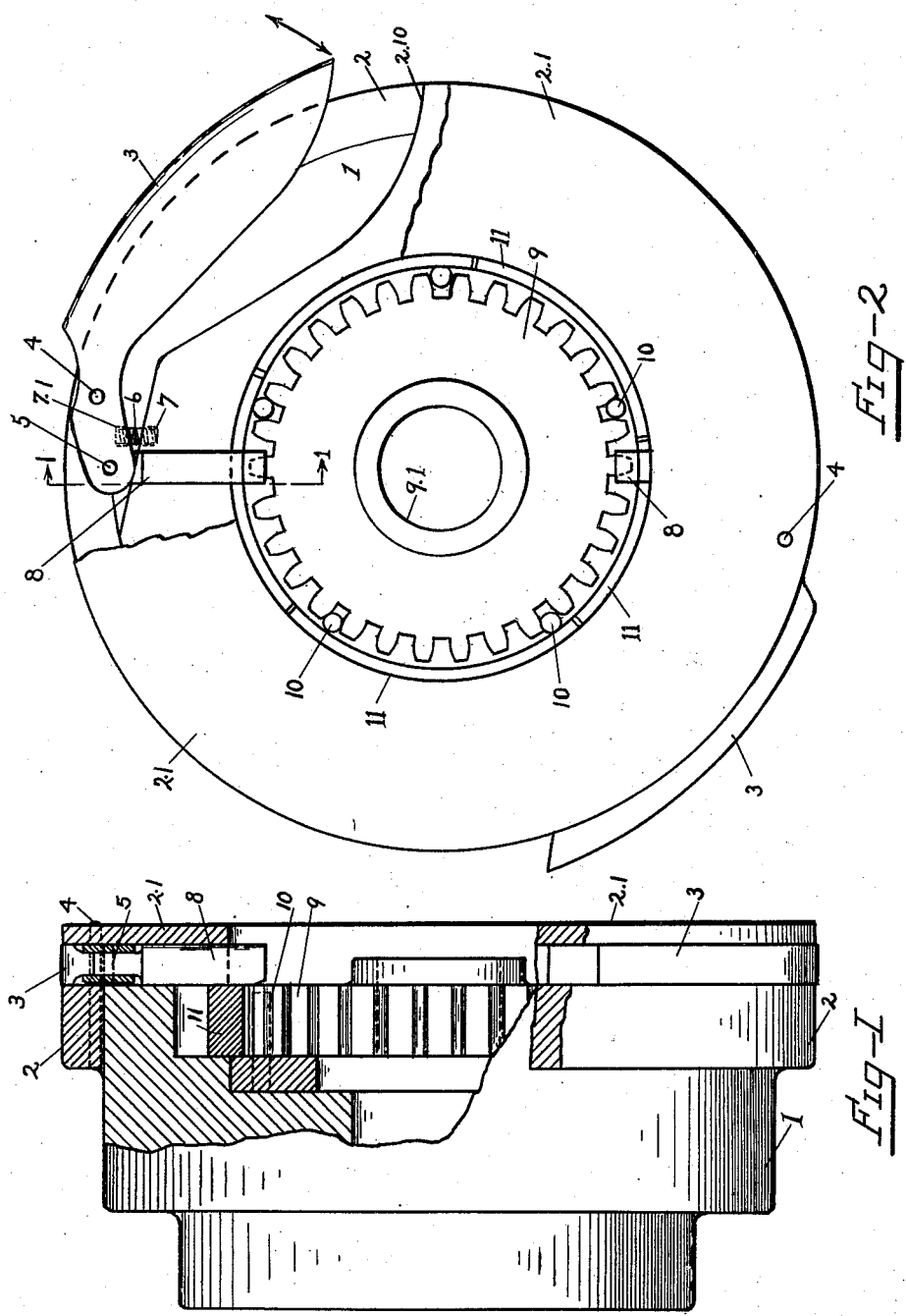

2,450,970

UNITED STATES PATENT OFFICE 2,450,970.

CHUCK FOR INTERNAL GRINDERS

Herbert C. Lance, Rock Island, and Herman A. Hippen, Moline, Ill.

Application January 30, 1946, Serial No. 644,378

7 Claims. (Cl. 279—1)

Our invention relates to a holder for internal grinders and similar machines.

The objects of our invention are to provide a simple means for retaining metal parts against longitudinal displacement from a chuck while being held therein for internal grinding, boring or similar operations, which can be operated automatically by centrifugal motion of the chuck and which will automatically release the part so held in the chuck when the revolution of the chuck stops.

Our invention is illustrated in the accompanying drawings, in which,

Figure 1 is a side elevation of a chuck embodying our invention, with parts broken away in order to disclose the internal arrangement;

Figure 2 is a front elevation of a chuck with our invention applied thereto, but with a part of the supporting plate broken away to disclose the internal arrangement.

Similar numerals refer to similar parts in both views.

Our apparatus is designed for application to the ordinary chuck and comprises an annular supporting or face plate 2.1 with a flange or ring 2 formed integral therewith. The flange or ring 2 is mountable upon the chuck 1 by a press-fit or by a close fit and may be retained in place by any suitable means.

The piece to be operated upon such as a gear wheel 9, is mounted upon the chuck in the usual way and may be secured against revolution by pitch line pins 10—10 and by cam bars 11—11, both of which are in common use and well known.

As such cam bars 11 sometimes become loose and allow the part being operated on to be displaced longitudinally from the chuck, particularly when the internal grinding or boring tool is being withdrawn, we have provided lock-bars or detents 8—8 which are carried upon the short arms of the weights 3—3 and pivoted thereto by the pivot pins 5. These lock-bars or detents 8—8 are movable radially toward or away from the axis of the chuck. The weights 3—3 are pivotally mounted upon pivot pins 4—4 secured in the annular face plate 2.1 and flange ring 2, and the face plate 2.1 is provided with recesses 2.10 in which the weights 3—3 may lie when at rest.

The face plate 2.1 is also provided with a bore 7 corresponding to and in line with a similar bore 7.1 formed in the short arm of the weights 3—3. In these bores coiled compression springs 6 are mounted which act to push the short arms of the weight levers outwardly and thus to seat the weights 3—3 in the recesses 2.10 when the chuck is at rest. When the chuck is revolving, the centrifugal force acts upon the weights 3—3 to force them outwardly and to overcome the pressure of the springs 6, thereby forcing the detent bars 8—8 inwardly in contact with the outer face of the gear wheel or other part to be internally ground and securing it firmly against forward displacement.

The inner faces of the bars 8 are preferably slightly tapered as shown in Figure 1 to facilitate engagement thereof with the gear wheel 9.

In Figure 2 we have shown two of the weights 3—3 with detent bars 8—8, but the number may be varied as desired.

In the operation of our invention, the gear wheel 9 is first placed upon the chuck and secured in position by the pitch line pins 10 and the cam bars 11 in the usual way. Then the chuck is put in motion, the centrifugal force caused by the revolution of the chuck throws the weights 3—3 outwardly, thereby moving the detent bars 8—8 inwardly in a radial direction and securing the wheel 9 against longitudinal displacement. When the chuck is stopped, the action of the springs 6 automatically returns the weights 3—3 to their recesses and withdraws the detent bars 8—8, thereby leaving the gear wheel 9 free to be removed from the chuck in the usual way.

While the detent bars are in contact with the gear 9, it is obvious that the internal grinder may be removed from the bore 9.1 without displacing the gear 9.

Various modifications may be made in the size, proportions and arrangement of the parts without departing from the spirit of our invention and we do not limit our claims to the precise forms shown in the drawings.

We claim:

1. In an internal grinder, the combination with a revolvable chuck of an annular plate mounted thereon, a plurality of recesses formed in the outer portion of the plate, weighted means pivoted to the plate and seatable in said recesses when at rest, detent bars united to said means arranged for radial movement whereby the inner ends of said bars will bear against a piece secured in the chuck for grinding to prevent forward displacement thereof as the weighted means is moved outwardly by centrifugal force when the chuck revolves at a given predetermined speed.

2. In an internal grinder, the combination with a revolvable chuck, of annular supporting means mounted upon the chuck, weighted means pivotally united to the supporting means, detaining means pivotally united to the weighted means arranged to be actuated by the relative movement of said weighted means and to bear against and detain a part held in the chuck for grinding when the chuck is revolving at a predetermined speed.

3. The combination as set out in claim 2 and recesses formed in the outer portion of the supporting means arranged to receive the weighted means when at rest, and resilient means united to the supporting means and the weighted means arranged to draw the weighted means into said recesses when the chuck is at rest.

4. In an internal grinder, the combination with a revolvable chuck, of an annular plate mounted thereon, a plurality of peripheral recesses formed in the outer portion of the plate, a corresponding plurality of levers pivoted near one end upon the plate and seatable in said recesses when at rest, a plurality of detent bars arranged for radial movement whereby the inner ends of said bars will bear against a piece secured in the chuck for grinding to prevent forward displacement thereof and with the outer ends of said detent bars pivotally united to the shorter arms of said levers respectively and so arranged that the detent bars will be moved inwardly as the longer arms of the levers are moved outwardly by centrifugal force when the chuck revolves.

5. A combination as described in claim 4, opposed spring seats formed in the plate and shorter arms of the levers, and coiled springs seated in said seats arranged to exert sufficient pressure outwardly against the adjacent ends of said levers to cause the longer ends of said levers to seat in the recesses when the chuck is at rest.

6. A combination as described in claim 4, opposed spring seats formed in the plate and shorter arms of the levers, and coiled springs seated in said seats arranged to exert sufficient pressure outwardly against the adjacent ends of said levers to cause the longer ends of said levers to seat in the recesses when the chuck is at rest and to permit the longer arms on said levers to be carried outwardly by centrifugal force when the chuck is revolved at a predetermined speed.

7. A combination as described in claim 4, and springs interposed between the plates and the levers arranged to exert limited pressure against the shorter arms of the levers sufficient to cause the levers to seat in the recesses respectively when the chuck is at rest, but able to be overcome by centrifugal force when the chuck is revolved at a predetermined speed.

HERBERT C. LANCE.
HERMAN A. HIPPEN.

REFERENCES CITED

The following references are of record in the file of this patent:

UNITED STATES PATENTS

| Number | Name | Date |
|---|---|---|
| 1,306,588 | France | June 10, 1919 |
| 1,430,689 | Schroeder et al. | Oct. 3, 1922 |
| 1,444,721 | Zumdahl | Feb. 6, 1923 |
| 2,039,711 | Einstein | May 5, 1936 |